United States Patent [19]
Greer et al.

[11] Patent Number: 6,078,846
[45] Date of Patent: Jun. 20, 2000

[54] CALIBRATION AND COMPENSATION OF ROBOT-BASED GAUGING SYSTEM

[75] Inventors: Dale R. Greer, Novi, Mich.; Munsang Kim, Seoul, Rep. of Korea

[73] Assignee: Perceptron, Inc., Plymouth, Mich.

[21] Appl. No.: 09/008,711

[22] Filed: Jan. 19, 1998

Related U.S. Application Data

[63] Continuation-in-part of application No. 08/597,281, Feb. 6, 1996, Pat. No. 5,748,505.

[51] Int. Cl.[7] .............................. G06F 19/00; G06G 7/66
[52] U.S. Cl. .............................. 700/174; 96/245; 96/259; 96/269
[58] Field of Search .............................. 356/139.03, 376; 702/95, 153; 700/69, 174

[56] References Cited

U.S. PATENT DOCUMENTS

| | | | |
|---|---|---|---|
| 4,621,332 | 11/1986 | Sugimoto et al. | 395/95 |
| 4,645,348 | 2/1987 | Dewar et al. | 356/376 |
| 4,841,460 | 6/1989 | Dewar et al. | 702/95 |
| 4,964,722 | 10/1990 | Schumacher | 356/139.03 |
| 5,090,803 | 2/1992 | Ames et al. | 536/193.03 |
| 5,329,469 | 7/1994 | Watanabe | 395/94 |
| 5,388,059 | 2/1995 | DeMenthon | 702/153 |
| 5,400,638 | 3/1995 | Kim | 73/1 |
| 5,552,883 | 9/1996 | Busch-Vishniac et al. | 356/139.03 |

*Primary Examiner*—William Grant
*Assistant Examiner*—McDieunel Marc
*Attorney, Agent, or Firm*—Harness, Dickey & Pierce, P.L.C.

[57] ABSTRACT

The non-contact sensor employs a structured light source that emits light in a predefined planar configuration and an optical receiver for reading reflected light produced by the structured light source within a predefined field of view. A tetrahedron target structure includes a three-dimensional framework that defines at least three non-collinear, non-coplanar structural lines each simultaneously visible to the sensor. A calibration system is coupled to the gauging system and the non-contact sensor for calibrating the gauging system by evaluating the geometric relationship of the structured light reflected from the structural lines of the target structure to determine the position and orientation of the target structure and then correlating the structural lines to the gauging system.

45 Claims, 4 Drawing Sheets

CALIBRATION AND COMPENSATION OF ROBOT-BASED GAUGING SYSTEM

CROSS-REFERENCE TO RELATED APPLICATIONS

This is a continuation-in-part of U.S. Pat. Ser. No. 08/597,281, filed Feb. 6, 1996, now U.S. Pat. No. 5,748,505, entitled "Method And Apparatus For Calibrating A Non-Gauging Sensor With Respect To An External Coordinate System," assigned to the assignee of the present invention.

BACKGROUND AND SUMMARY OF THE INVENTION

The present invention relates generally to non-contact gauging systems. More particularly, the invention relates to an apparatus system and method for calibrating non-contact gauging systems.

Demand for higher quality has pressed manufacturers of mass produced articles, such as automotive vehicles, to employ automated manufacturing techniques that were unheard of when assembly line manufacturing was first conceived. Today, robotic equipment is used to assemble, weld, finish, gauge and test manufactured articles with a much higher degree of quality and precision than has been heretofore possible. Computer-aided manufacturing techniques allow designers to graphically conceptualize and design a new product on a computer workstation and the automated manufacturing process ensures that the design is faithfully carried out precisely according to specification. Machine vision is a key part of today's manufacturing environment. Machine vision systems are used with robotics aned computer-aided design systems to ensure high quality is achieved at the lowest practical cost.

Achieving high quality manufactured parts requires highly accurate, tightly calibrated gauging systems. Not only must the gauging system have a suitable resolution to discern a manufactured feature of interest, it must be accurately calibrated to a known frame of reference so that the feature of interest may be related to other features on the workpiece. Without accurate calibration, even the most sensitive, high resolution gauging system will fail to produce high quality results.

Keeping the gauging system properly calibrated is more easily said than done. In a typical manufacturing environment gauging systems and their associated robotic mounting structures may get bumped or jarred, throwing the system out of alignment. Also, from time to time, a sensor within the system may need to be replaced, almost certainly requiring reorienting and recalibrating.

One problem with gauging system alignment and calibration is the time required. Invariably, the entire manufacturing assembly line for a given part must be shut down and the workstation cleared whenever it is necessary to recalibrate the gauging system. In some instances this entails placing an independently measured (and very expensive) full-scale model of the workpiece in the workstation. This independently measured workpiece is sometimes called a master part. The master part is placed in careful registration with the external coordinate system of the workstation and then the gauging system sensor is trained on its assigned feature (such as a hole or edge). From the known position of the external coordinate system, the gauging system is recalibrated. Only then can the assembly line be brought back online.

Whereas the aforementioned calibration technique does work, there is considerable interest in a calibration technique that is quicker and easier to accomplish and that eliminates the need to rely on expensive master parts. To this end, the present invention provides a calibration system that can be used in a matter of minutes, instead of hours, and without the need for precisely manufactured master parts or theodolite equipment. A major advantage of the invention is that it allows the calibration of a system comprising a sensor mounted on the end of a robot arm to be checked or realigned between line shifts, without requiring the line to be shut down for an extended period. In addition to calibrating sensors, the calibration techniques contemplated by the present invention may also be used in the more general case to true-up or straighten the coordinate frame of a robotic system and to provide tool center point (TCP) calibration.

In another aspect the calibration system of the invention may be used to determine the appropriate calibration factors needed to compensate for link length changes and other mechanical changes in a robotic system. A robotic system typically employs several movable members, joined for pivotal or articulated movement. These movable members or links, being connected to one another, define geometric relationships by which the coordinate system of the robot gripper can be calibrated with respect to the coordinate frame of the robot base. These relationships depend, of course, upon the lengths of the links involved. Unfortunately, most materials change length as temperature changes. Many modem day robots are manufactured from aluminum, which has a substantial coefficient of expansion. Thus, a robotic system that is calibrated at a first temperature may not remain calibrated once the work environment drifts to a different temperature. Temperature fluctuations are quite prevalent in many manufacturing environments, hence loss of calibration due to link length change and other mechanical changes as heretofore been a frustrating fact of life.

The present invention provides a quick and convenient solution to the link length problem, using a plurality of the target structures described above. A robot equipped with a non-contact sensor is caused to move to different locations at which the target structures are disposed. By placing the target structures in known locations, the robot, with sensor in gripper, discovers each target in its field of measurement and is thereby calibrated in different states of arm extension. The system analyzes positional data obtained at each of the target stations and uses mathematical transformations to determine the current link lengths. This information may then be used to calibrate the system for the current ambient temperature. Because the system is quick and easy to use, it can be employed periodically to check and recalibrate the system without lengthy plant shutdown. This technique may also be used to compensate for changes of the sensor with temperature, as well as changes in rotary joints.

Briefly, a non-contact sensor is disposed on the movable member and emits structured light in a predefined planar configuration. A target structure preferably of a tetrahedron configuration is disposed within a field of view of the non-contact sensor. The target has a three-dimensional framework that defines at least three non-collinear, non-coplanar structural lines. The non-contact sensor for sensing the spacial location and orientation of the target structure also has an optical receiver for receiving reflected light emitted by the non-contact sensor. A coordinate translation system is connected to the non-contact sensor for calibrating the sensor to a target structure based upon the structured light reflected from the structural lines of the target structure.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

Figure 1:
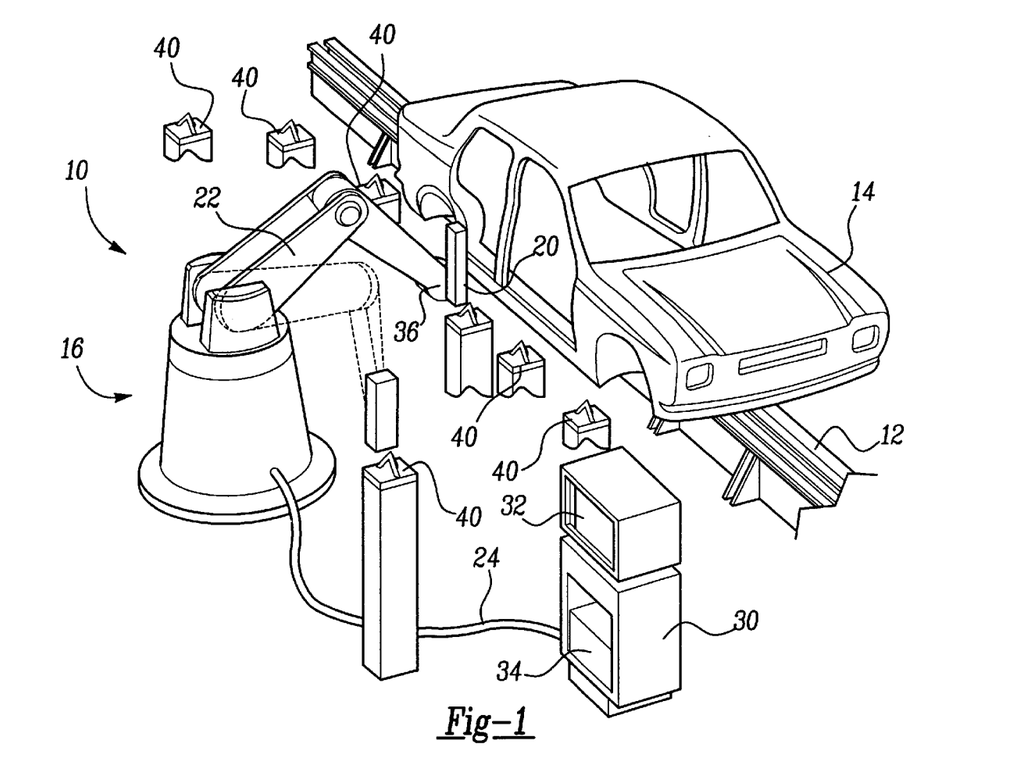
FIG. 1 is a perspective view of a robot sensing station on an automotive assembly line, including a plurality of tetrahedron shaped target structures for use in calibrating the robot guidance system according to the principles of the present invention.

An exemplary non-contact gauging system of the type commonly employed in vehicle assembly lines is shown in FIG. 1. In FIG. 1, the non-contact gauging system 10 is shown employed with a vehicle assembly line that includes a conveyer system 12 for carrying vehicle bodies 14 through various assembly stations. A non-contact gauging system 10 is often used for the vehicle body components for ensuring that each component is assembled within predefined tolerances. For example, the non-contact gauging system 10 may measure the door aperture or side aperture of a vehicle body in order to ensure that the doors or other body components will properly fit within the apertures and that the apertures are within tolerance.

Of course, in order for the non-contact gauging system 10 to accurately perform its assigned task, the sensor orientation on the robot arm 22 must be properly calibrated. In the initial position, orientation and geometric distortions of the robot arm 22 must also be accounted for.

Figure 4:
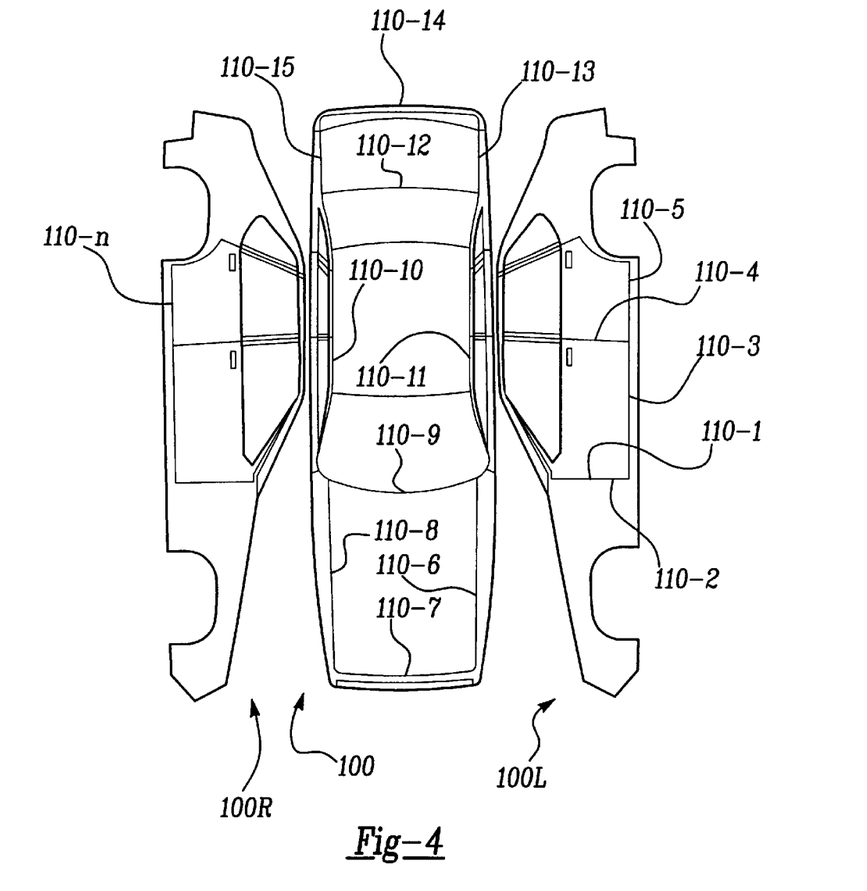
FIG. 4 is a top view of a typical automobile body unfolded to reveal measurement points.

Although the invention is not limited to automotive applications, an exemplary use would be in an automotive assembly plant. With reference to FIG. 4, there is shown a typical automotive vehicle body portion which, prior to its assembly with other vehicle components, would require gauging of certain key points. Such miscellaneous points of interest on workpiece 100 of FIG. 4 are shown as points 110-1 through 110-N. The left side 100L of the vehicle body and the right side 100R of the vehicle body are shown in an unfolded view for convenience in FIG. 1. Typical usages of the points or the manner in which they are selected would be dictated, for example, by the ensuing assembly process to take place with respect to the workpiece 100. For example, assume that the hood has not yet been assembled over the hood cavity at the front of the vehicle. The measurements about the periphery of the hood cavity, such as points 110-6, 110-7, 110-8, and 110-9, could be made to determine whether the ensuing assembly of the hood lid to the vehicle body can be performed with an acceptable fit between the parts to be assembled.

With reference again to FIG. 1, a single non-contact sensor 20 is mounted on a robot arm 22 which is movable to a plurality of positions for measuring the periphery of, for example, a door aperture. The sensor provides structured light (i.e., light illuminating planar pattern). For further details regarding a suitable structured light sensor, reference may be had to U.S. Pat. No. 4,645,348 to Dewar et al., assigned to the assignee of the present invention. The robot arm 22 includes at least one member 36. Measurement of the door aperture might require measurement of a plurality of points, such as at points 110-1, 110-5 as shown in FIG. 4. The robot arm 22 can be moved to a plurality of positions so that non-contact sensor 20 can measure the location of each point. Communication cables 24 connect the sensor and the motion system of robot arm 22 to a machine vision computer 30 which includes a CRT (cathode ray tube) display 32. Optionally provided with a typical machine vision computer is a printer 34.

The apparatus and method of this invention may be used to effect calibration of the sensor orientation on the robot gripper 36 as well as determining the position, orientation, and geometric distortions of the robot arm 22 with respect to a predetermined external coordinate system or reference frame, associated, for example, with the automobile body 14 to be measured, or with respect to an external reference frame associated with the gauging station itself.

Figure 2:
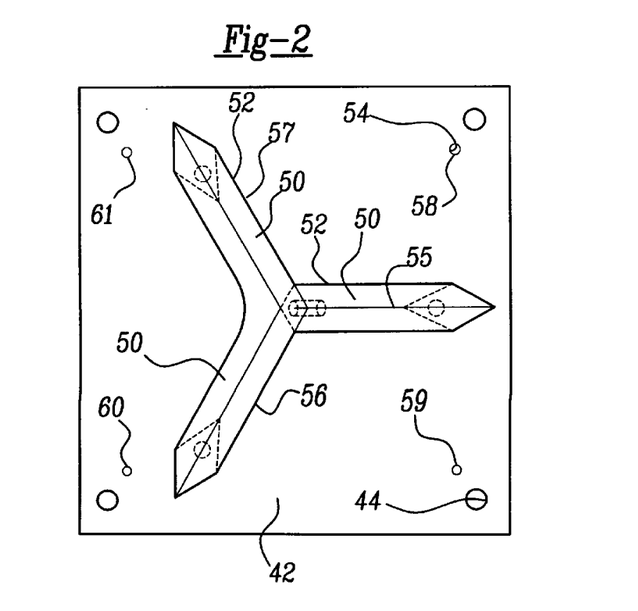
FIG. 2 is a top view of a tetrahedron shaped target structure according to the principles of the present invention.
Figure 3:
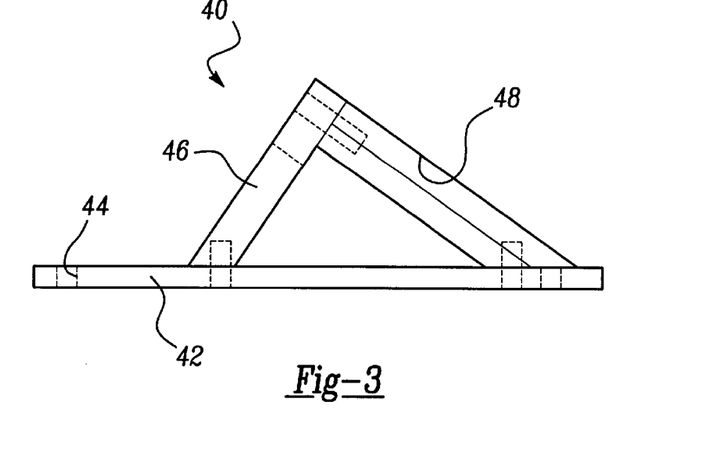
FIG. 3 is a side view of a tetrahedron shaped target structure according to the principles of the present invention.

In order to calibrate the non-contact gauging system 10 of the present invention, a plurality of target structures 40 are provided. Each target structure 40 is formed as a tetrahedron as shown in detail in FIGS. 2 and 3. In general, each target structure 40 includes a planar base plate 42 provided with a plurality of mounting holes 44. A generally V-shape member 46 and a generally straight strut member 48 (both of square cross section) are connected to one another and mounted to plate 42 so as to form a framework of individual struts 50. The struts 50 each define a straight edge 52 along each inner and outer facing edges 52.

Figure 5:
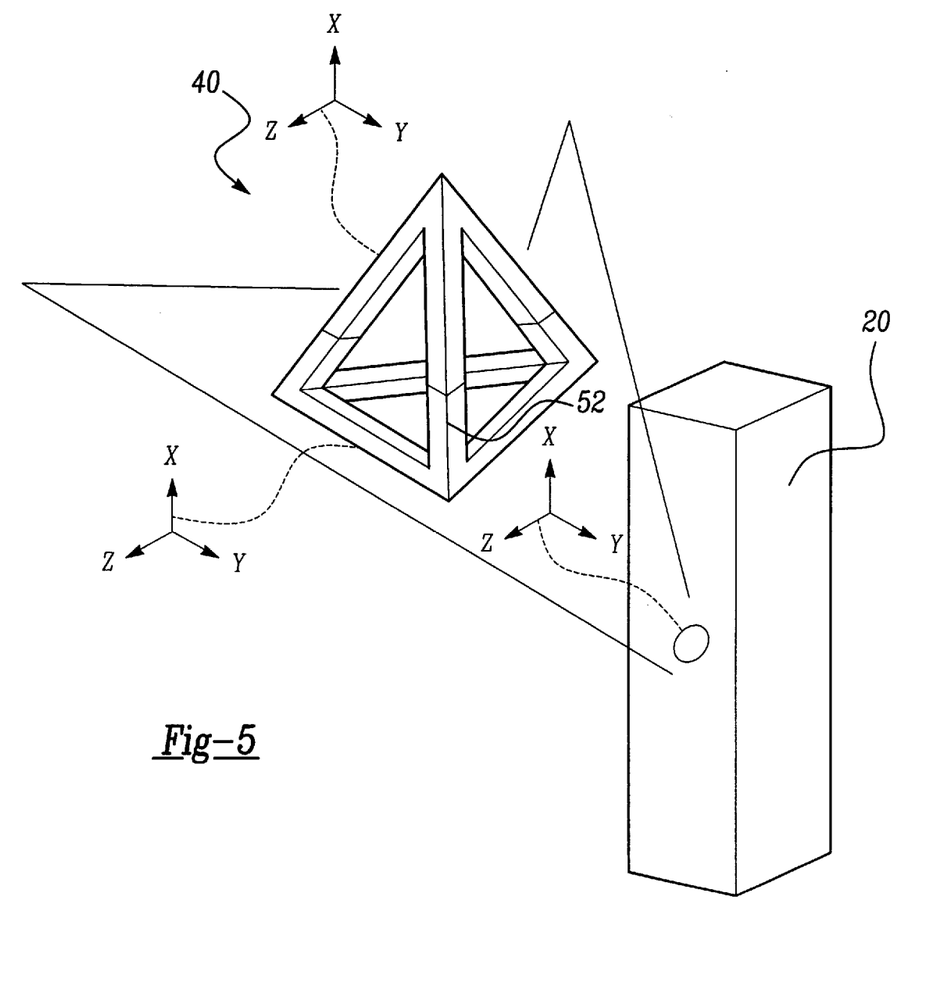
FIG. 5 is a perspective view of a tetrahedron shaped target structure being illuminated by a non-contact sensor according to the principles of the present invention.

The plurality of target structures 40 are provided at various locations within the zone of the non-contact gauging system 10. The location of each target structure 40 in the target coordinate system is entered into the machine vision computer 30. One or more target structures 48 may be used for determining the sensor orientation on the gripper. The robot arm 22 is moved to a position such as that shown in phantom lines wherein non-contact sensor 20 can illuminate the target structure 40 with structured light (i.e., light emanating in a planar pattern), such that the struts 50 and straight edges 52 facing the structured light source are illuminated as illustrated in FIG. 5. The non-contact sensor 20 of the preferred embodiment emits a planar structured light pattern during operation. By illuminating the target structure 40, a characteristic reflected light pattern is achieved, as illustrated in FIG. 5 which can be sensed by non-contact sensor 20. Because the straight edges 52 are non-collinear and non-coplanar, the location and orientation (XYZ position and roll, pitch and yaw) of the non-contact sensor 20 may be precisely ascertained relative to the known orientation of target structure 40, and thus the XYZ position and roll, pitch and yaw of the non-contact sensor 20 may also be precisely ascertained.

A contour sensor is a non-contact sensor which, by projecting a plane of light (structured light) and through triangulation, can measure in two dimensions, specifically in the YZ plane as shown in FIG. 5.

The non-contact sensor 20 in the present embodiment is a so-called contour sensor, which is only capable of two dimensional (2D) measurements. The contour sensor uses a projection of a plane of light, which is viewed at a triangulation angle, can measure in the two dimensions of Y and Z as shown in FIG. 5. To provide focus through the entire light plane in the contour sensor, the Schiempflug method is used.

As such a sensor cannot normally measure the full six degrees of freedom, there is a need for a target that can create the full X, Y and Z information. The geometric relationships of the light plane intersecting the target structure 40 measuring the three corners will create sufficient information that can derive the full six degree of freedom of X, Y, Z, roll, pitch and yaw.

The mounting holes 44 (or an alternate locating structure 54) may be used to link the target structure 40 to the user coordinate frame. The position of these reference points may be discovered through a variety of suitable techniques, theodolite location being one such technique. The user coordinate frame would typically be that referenced frame with respect to which the gauging station is disposed. Any three locating structures (58, 59, 60, 61) on the base plate define a plane and thereby establish the location of the base plate with respect to all six degrees of freedom.

Because the struts 50 of the target structure are fixably secured to the base plate, the target structure is also thereby referenced to the user coordinate frame. The coordinate system of the sensor 20 can be tied to the user coordinate frame using the target structure. In this regard, the reflected light "lines", formed by the intersection of the structured light plane with the edges 52 and surfaces of struts 50, define an intermediate reference frame by which the sensor reference frame can be fixed relative to the user coordinate frame.

The presently preferred embodiment uses a tetrahedron target, although other geometric shapes may also be used. The tetrahedron is presently preferred because of its simplicity. Generally, however, the target structure simply needs to provide sufficient geometric features to uniquely define all six degrees of freedom. Of course, in some applications not requiring all six degrees of freedom, the target structure may be simplified by relaxing these six degree of freedom constraint.

When calibrating a sensor, or when straightening up the coordinate frame of a robot arm, or finding the tool center point (TCP), the non-contact sensor 20 is placed in the gripper of the robot or otherwise affixed to the robot arm. The non-contact sensor and the robot arm to which it is affixed thus define the sensor reference frame. The sensor is then moved by manipulating the robot arm until the sensor acquires the target structure 40. The target structure 40, having been previously secured in a known location with respect to the user coordinate frame, reflects structured light containing user reference frame geometrical information back to the sensor. The machine vision computer 30 then preforms the appropriate transformation to link the sensor reference frame with the user reference frame. Once the link has been established it can be stored in the machine vision computer for use in interpreting data collected by the sensor when the apparatus is in use in a gauging application or for robot guidance.

In general, only one target is required to find the sensor-to-gripper orientation or to find the tool center point (TCP). In some applications multiple target structures, deployed at different known locations, may be used to provide complete calibration. Typically a minimum of three to five target structures would be used to perform an initial calibration on a system. Finding the tool center point (TCP) would typically employ three target structures.

While the presently preferred embodiment locates the target structure in fixed location relative to the user coordinate frame and the sensor in a fixed location relative to the movable member (e.g. robot arm), the opposite arrangement is also possible without departing from the spirit of the invention as set forth in the appended claims. Thus, in certain applications the sensor may be fixed relative to the user coordinate frame and the target structure fixed relative to the movable member. Essentially, the same geometric transformation would be used to determine the relationship between the user reference frame and the movable member reference frame.

In a more sophisticated arrangement, the calibration system of the invention can be used to compensate for link length changes, joint angle changes and other contortions due to external factors such as ambient temperature fluctuation. In this embodiment, target structures 40 are placed at multiple locations that will entail movement of all relevant links and joints of the robot arm. At each target structure 40 positional information is acquired, preferably for all six degrees of freedom. The data are then stored in a memory storage device 144 (FIG. 6) for subsequent computer manipulation. Although other representations are possible, the data gathered at each target structure can be stored in association with the corresponding joint angle data derived from the robot links.

For example, when a target structure 40 is illuminated, the data obtained from the reflected structured light is stored along with the joint angles, each joint angle is then decomposed into X, Y and Z values employing Jacobean theory of coordinate transformation. If the variable K is used to represent the number of target measurements and the variable N represents the number of members in the robot arm, then a Jacobean matrix of a size $3K \times N$ results, (3K represents the X, Y and Z values for each target measurement). A typical robot might have six links (N=6). However, adding three more links to the equations will allow the system to compensate for sensor deviations over temperature. This means that a minimum of three targets should be located for the N=6+3 link system in order to solve the equations. It is also possible to adjust the 6 joint angles in the model, which would require a minimum of an additional two targets of measurement. Once the Jacobean matrix is filled, a least squares computation is performed to provide a value which represents the relative position and orientation of each robot arm member. The greater the number of measurements taken of each target structure 40, the more accurate the least squares result will be. In the preferred embodiment the 3K dimension is greater than N. While it is true that the more measurements taken the greater is the accuracy of the system (a better least squares solution is calculated), the quality of the mathematical model may also be evaluated with more samples as well as by evaluation of the residuals. Note that only X, Y and Z translational deviations are needed. The Roll, Pitch and Yaw information is typically not used. Adding joint angle compensation increases the number of unknowns by another 6, creating a need for 6+3+6=15 knowns, which may be obtained with a minimum of five targets, yielding 3*5=15. There are a plurality of methods for determining a least squares result, however, the present embodiment uses a pseudo-inverse algorithm known as the Graville algorithm. The Graville algorithm produces a pseudo-inverse of an M by N real matrix where M=3K. Therefore, a least squares result can be obtained from a rectangular or a singular square matrix. The result of the pseudo-inverse calculation is a minimized $N \times 3K$ matrix.

Figure 6:
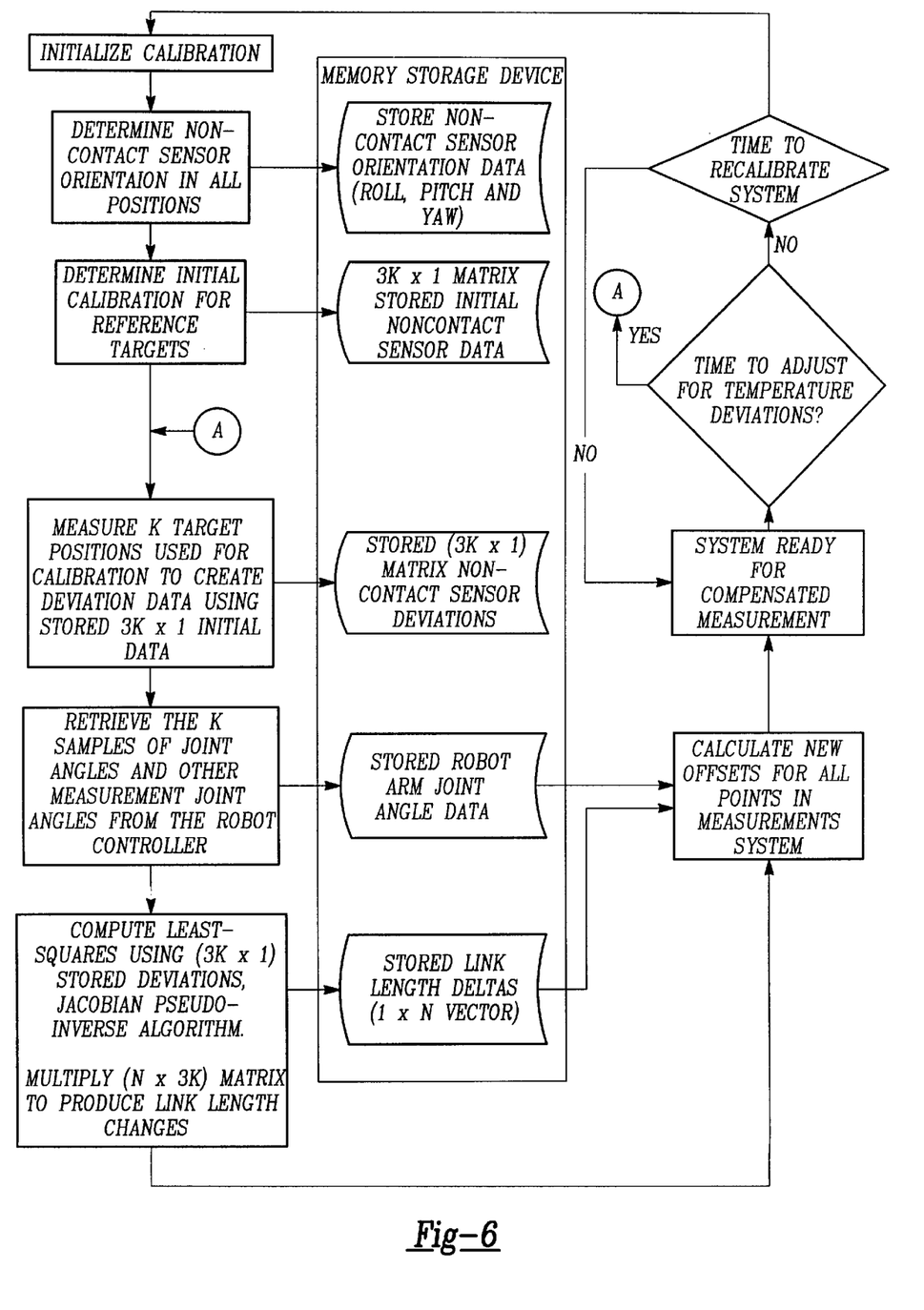
FIG. 6 is a data flow diagram according to the principles of the present invention.

Measurement data taken during the initial calibration that indicates location of the non-contact sensor 20 relative to each target structure 40 is compared to each subsequent set of calibrations in order to determine the deviation of the non-contact sensor 20. The sensor deviation data is then read into a $3K \times 1$ matrix, a deviation vector, that represents the X, Y and Z deviations for each measurement taken. The geometric distortion is then calculated by multiplying the deviation vector by the result of the Jacobean matrix minimization. A coordinate translation system 148 is included that makes the required corrections based on the geometric distortions of the robot 16 and sensor system 20. The present invention is not only capable of correcting for thermal distortions, but also can indicate a change such as a physical shift in the workstation. In general, the targets should be made more stable than the required measurement accuracy.

For a further understanding of the mathematics used to in the system described above reference may be had to U.S. Pat. No. 5,400,638, entitled "Calibration System for Compensation of Arm Length Variation of an Industrial Robot Due to Peripheral Temperature Change."

From the foregoing, it will be appreciated that the present invention provides a significant advance in the gauging and robotic system art. The invention calibrates the non-contact sensor 20 and robot arm 22 to an external reference frame without the need for expensive master parts and without the need for labor intensive calibration using sighting devices.

While the invention has been described in its presently preferred embodiment, it will be understood that the invention is capable of modification without departing from the spirit of the invention as set forth in the appended claims.

What is claimed is:

1. A movable gauging system of the type having at least one movable member that is movable within an external measurement zone having associated therewith an external coordinate system, comprising:
   a non-contact sensor having associated therewith a field of view defining a sensor measurement zone and disposed on the movable member so that said non-contact sensor is moveable in association with the movable member within said external measurement zone;
   at least one target structure having a three-dimensional framework that defines at least three non-collinear, non-coplanar structural lines, said at least one target structure having a known location within said external measurement zone relative to said external coordinate system;
   said non-contact sensor being positionable by said movable member so that said target structure is located within said field of view of the sensor for sensing the spatial location and orientation of said at least one target structure within said sensor measurement zone; and
   a coordinate translation system connected to said non-contact sensor for calibrating the gauging system to said external coordinate system, said coordinate translation system performing a geometric transformation for linking said sensor measurement zone with said external coordinate system and generating gauging reference coordinates which compensate for positional error associated with the moveable member.

2. The apparatus of claim 1 further comprising:
   a robot controller device for positioning said non-contact sensor within said field of view of said at least one target structure.

3. The apparatus of claim 1, wherein said coordinate translation system determines an intermediate reference frame from the light reflected from said structural lines of said target structure by which said sensor measurement zone can be fixed relative to said external coordinate system.

4. The apparatus of claim 1, wherein said non-contact sensor employs a structured light source, said non-contact sensor emitting structured light in a predetermined planar configuration and having an optical receiver for receiving reflected light emitted by said non-contact sensor.

5. The apparatus of claim 1, further comprising:
   a memory storage device connected to said non-contact sensor for storing data, wherein an output signal from said non-contact sensor indicative of the spatial location and orientation of said at least one target structure is stored in said memory storage device as data;
   said coordinate translation system connected to said memory storage device for determining a variation in the relationship of said non-contact sensor to the spatial location and orientation of said at least one target structure by retrieving said data from said memory storage device and calculating the variation.

6. The apparatus of claim 5, wherein said coordinate translation system determines a variation in length of the movable member resulting from temperature variation.

7. The apparatus of claim 6, wherein said coordinate translation system compensates for a variation in length of the movable member.

8. The apparatus of claim 1, wherein said non-contact sensor is a two-dimensional structural light sensor.

9. The apparatus of claim 1, wherein said target structure is a tetrahedron.

10. The apparatus of claim 1, wherein said coordinate translation system determines a variation in joint angle associated with at least one movable member resulting from temperature variation.

11. The apparatus of claim 1, wherein said coordinate translation system compensates for variation in joint angle associated with at least one movable member resulting from temperature variation.

12. The apparatus of claim 1, wherein said coordinate translation system compensates for sensor variation.

13. A movable robot gauging system of the type used to control a robot having at least one movable member that is movable within an external measurement zone having associated therewith an external coordinate system, comprising:
   a non-contact sensor having associated therewith a field of view defining a sensor measurement zone and disposed on the movable member so that said non-contact sensor is movable in association with the movable member throughout six degrees of freedom within said external measurement zone;
   at least one target structure having a three-dimensional framework that defines at least three non-collinear, non-coplanar structural lines, said at least one target structure having a fixed known location within said external measurement zone relative to said external coordinate system;
   said non-contact sensor being positionable by said movable member so that said target structure is located within said field of view of the sensor for sensing the spatial location and orientation of said at least one target structure within said sensor measurement zone;
   a robot controller device for causing the movable member of the robot and the sensor to make optical contact with said target structure to establish a target structure coordinate point of said target structure to the robot, the robot controller device also causing said robot to position said non-contact sensor within said field of view of said target structure from the target structure coordinate point; and
   a coordinate translation system connected to said non-contact sensor for calibrating the gauging system to said external coordinate system, said coordinate translation system performing a geometric transformation for linking said sensor measurement zone with said external coordinate system and generating gauging reference coordinates which compensate for positional error associated with the moveable member.

14. The apparatus of claim 13, wherein said coordinate translation system determines the position and orientation of said at least one target structure and then correlates said at least one target structure to said non-contact sensor to determine the position and orientation of said non-contact sensor.

15. The apparatus of claim 13, wherein said non-contact sensor employs a structured light source, said non-contact sensor emitting structured light in a predefined planer configuration and having optical receiver for receiving reflected light emitted by said non-contact sensor.

16. The apparatus of claim 13, further comprising:
a memory storage device connected to said non-contact sensor for storing data, wherein an output signal from said non-contact sensor indicative of the spatial location and orientation of said at least one target structure is stored as data;
said coordinate translation system connected to said memory storage device for determining a variation in the relationship of said non-contact sensor to the spatial location and orientation of said at least one target structure by retrieving said data from said memory storage device and calculating the variation.

17. The apparatus of claim 16, wherein said coordinate translation system determines a variation in length of the movable member resulting from temperature variation.

18. The apparatus of claim 17, wherein said coordinate translation system compensates for a variation in length of the movable member.

19. The apparatus of claim 13, wherein said non-contact sensor is a contour sensor.

20. The apparatus of claim 13, wherein said target structure is a tetrahedron.

21. The apparatus of claim 13, wherein said target structure includes a plate with at least one aperture.

22. The apparatus of claim 13, wherein said coordinate translation system determines a variation in joint angle associated with at least one movable member resulting from temperature variation.

23. The apparatus of claim 13, wherein said coordinate translation system compensates for variation in joint angle associated with at least one movable member resulting from temperature variation.

24. The apparatus of claim 13, wherein said coordinate translation system compensates for sensor variation.

25. A movable robot gauging system of the type having at least one movable member, comprising:
at least one non-contact sensor, said non-contact sensor being positioned in a first coordinate space defining a sensor reference frame;
a target structure for attaching to a movable member of the robot, said target structure including a three-dimensional framework that defines at least three non-collinear, non-coplanar structural lines, said at least one target structure being movable in association with the movable member within a second coordinate space defining a target reference frame;
said non-contact sensor sensing the spatial location and orientation of said at least one target structure, said non-contact sensor emitting structured light in a predefined planar configuration and having an optical receiver for receiving reflected light emitted by said non-contact sensor; and
a coordinate translation system connected to said at least one non-contact sensor for calibrating the sensor to said at least one target structure based upon the structured light reflected from said structural lines of said target structure, said coordinate translation system performing a geometric transformation for linking said sensor reference frame with said target reference frame and generating gauging reference coordinates which compensate for positional error associated with the moveable member.

26. The apparatus of claim 25 further comprising:
a robot controller device for positioning said target structure within said field of view of said at least one non-contact sensor.

27. The apparatus of claim 26, further comprising:
a memory storage device connected to said non-contact sensor for storing data, wherein an output signal from said non-contact sensor indicative of the spatial location and orientation of said at least one target structure is stored as data;
said coordinate translation system connected to said memory storage device for determining a variation in the relationship of said non-contact sensor to the spatial location and orientation of said at least one target structure by retrieving said data from said memory storage device and calculating the variation.

28. The apparatus of claim 27, wherein said coordinate translation system determines a variation in length of the movable member resulting from temperature variation.

29. The apparatus of claim 28, wherein said coordinate translation system compensates for a variation in length of the movable member.

30. The apparatus of claim 25, wherein said coordinate translation system determines the position and orientation of said target structure and then correlates said at least one target structure to said at least one non-contact sensor to determine the position and orientation of said target structure.

31. The apparatus of claim 25, wherein said non-contact sensor employs a structured light source.

32. The apparatus of claim 25, wherein said non-contact sensor is a contour sensor.

33. The apparatus of claim 25, wherein said target structure is a tetrahedron.

34. The apparatus of claim 25, wherein said coordinate translation system determines a variation in joint angle associated with at least one movable member resulting from temperature variation.

35. The apparatus of claim 25, wherein said coordinate translation system compensates for variation in joint angle associated with at least one movable member resulting from temperature variation.

36. The apparatus of claim 25, wherein said coordinate translation system compensates for sensor variation.

37. A robot based gauging system comprising:
at least one movable member associated with a robot that is movable within an external measurement zone having associated therewith an external coordinate system;
a robot guidance system for guiding the robot;
an apparatus for calibrating said robot guidance system;
a non-contact sensor having associated therewith a field of view defining a sensor measurement zone and disposed on the movable member so that said non-contact sensor is movable in association with the movable member throughout six degrees of freedom within said external measurement zone;

at least one target structure having a three-dimensional framework that defines at least three non-collinear, non-coplanar structural lines, said at least one target structure having a known fixed location within said external measurement zone relative to said external coordinate system;

said non-contact sensor being positionable by said movable member so that said target structure is located within said field of view of the sensor for sensing the spatial location and orientation of said at least one target structure within said sensor measurement zone; and a coordinate translation system connected to said non-contact sensor for calibrating the gauging system to said external coordinate system, said coordinate translation system performing a geometric transformation for linking said sensor measurement zone with said external coordinate system and generating gauging reference coordinates which compensate for positional error associated with said moveable member, and said coordinate translation system determining an intermediate reference frame from the light reflected from said structural lines of said target structure by which said sensor measurement zone can be fixed relative to said external coordinate system.

38. The apparatus of claim 37 further comprising:
a robot controller device for positioning said non-contact sensor within said field of view of said at least one target structure.

39. The apparatus of claim 37, wherein said coordinate translation system determines a variation in joint angle associated with at least one movable member resulting from temperature variation.

40. The apparatus of claim 37, wherein said coordinate translation system compensates for variation in joint angle associated with at least one movable member resulting from temperature variation.

41. The apparatus of claim 37, wherein said coordinate translation system compensates for sensor variation.

42. A moveable gauging system comprising:
an external measurement zone having associated therewith an external coordinate system;
a movable member movable within said external measurement zone;
a sensor having associated therewith a field of view defining a sensor measurement zone, and mounted on said movable member so as to be positionable by said movable member at multiple selected positions within said external measurement zone to measure one or more predetermined features of a workpiece positionable within said external measurement zone, said sensor taking a measurement of a selected feature when said sensor is positioned by said movable member so that said selected feature is located within said sensor measurement zone;

at least one target structure disposed within said external measurement zone at a predefined location relative to said external coordinate system; and a coordinate translation system coupled to said sensor for calibrating said gauging system to said external coordinate system when said sensor is positioned by said movable member so that said target is located within said sensor field of view, said coordinate translation system performing a geometric transformation for linking said sensor measurement zone with said external coordinate system and generating gauging reference coordinates which compensate for positional error associated with the movable member.

43. A method of calibrating a movable gauging system relative to an external coordinate system defining an external measurement zone, said movable gauging system including a non-contact sensor having associated therewith a field of view defining a sensor measurement zone, and mounted on a robotic manipulator for moving said non-contact sensor within said external measurement zone for gauging a workpiece located within said external measurement zone, comprising the steps of:

providing a fixed location target at a predetermined location within the external measurement zone relative to said external coordinate system;

moving said robotic manipulator so as to position said fixed location target within said sensor field of view;

measuring the position of said fixed location target relative to said sensor measurement zone;

comparing said sensor measured target position with said predetermined target location;

performing a geometric transformation using a coordinate translation system for linking said sensor measurement zone with said external coordinate system;

generating gauging reference coordinates which compensate for positional error associated with the robotic manipulator; and calculating offset data from the measured target position and the predetermined target location and using the offset data for compensating for positional error associated with the robotic manipulator.

44. The method of claim 43 further including the step of measuring environmental conditions surrounding the robotic manipulator and determining whether a deviation in the environmental conditions requires recalibration of the gauging system.

45. The method of claim 43 further including the steps of:
moving the sensor via the robotic manipulator in proximity to the workpiece;
sensing features associated with the workpiece;
generating sensor measurement position data representing the position of the sensor with respect to the workpiece; and
applying the offset data to the sensor measurement position data for determining a position of the features associated with the workpiece.

* * * * *